United States Patent [19]

Roberts et al.

[11] Patent Number: 4,781,506
[45] Date of Patent: Nov. 1, 1988

[54] SELF-DRILLING SCREW

[75] Inventors: David J. A. Roberts, Mornington; Brian Brindle, Glen Waverley, both of Australia

[73] Assignee: W. A. Deutsher Pty. Ltd., Moorabbin, Australia

[21] Appl. No.: 938,358

[22] Filed: Dec. 4, 1986

Related U.S. Application Data

[62] Division of Ser. No. 658,107, Oct. 5, 1984, abandoned.

[51] Int. Cl.[4] ............................................. F16B 25/00
[52] U.S. Cl. ................................. 411/387; 408/230
[58] Field of Search ............... 411/386, 387, 417, 418, 411/420; 408/226, 230

[56] References Cited

U.S. PATENT DOCUMENTS

| | | | |
|---|---|---|---|
| 3,358,548 | 12/1967 | Dyslin | 411/387 |
| 3,395,603 | 8/1968 | Skierski | 411/387 |
| 3,517,581 | 6/1970 | Stokes et al. | 411/387 |
| 3,754,292 | 8/1973 | Reiland | 10/9 |
| 3,786,713 | 1/1974 | Sygnator | 411/387 |
| 4,407,620 | 10/1983 | Shinjo | 411/387 |
| 4,425,066 | 1/1984 | Kollmann | 411/387 |

FOREIGN PATENT DOCUMENTS 1484567 9/1977 United Kingdom ............... 411/387

Primary Examiner—Neill Wilson
Attorney, Agent, or Firm—T. W. Buckman; N. C. Johnson

[57] ABSTRACT

A self-drilling screw having a head at one end and a forged drilling end configuration at the other. The drilling end configuration comprises a pair of longitudinally extending flutes which are separated by land portions and which extend through a tapered tip end to form two cutting edges. The forging operation is performed in such a way as to promote complete formation of the tip end and that may be achieved by inhibiting material flow away from that tip end or by promoting extrusion of material towards the tip end. The drilling end portion of the screw is of elliptical cross section having a minor axis in the region of 60 to 80% of the major axis, and a fillet is formed in the base of each flute at the tip end portion of the flute. Each fillet has a flat surface arranged generally parallel to the screw axis and angularly relative to the ajacent cutting edge of the tip end. At least one interruption, which mau be a depression of a projection, is formed on each of a plurality of side surfaces of the drilling end portion. Also, each flute may comprise two end to end portions which extend at different angles to the longitudinal axis of the screw.

7 Claims, 6 Drawing Sheets

SELF-DRILLING SCREW

This application is a division of application Ser. No. 658,107, filed Oct. 5, 1984, and now abandoned.

This invention relates to self-drilling screws and is concerned with the method and means whereby such screws are formed. In particular, the invention is concerned with such screws in which the drilling end configuration is formed by a forging process.

Self-drilling screws are well known and U.S. Pat. No. 3,125,923 describes an example screw of that form. It is equally well known to form the drilling end of such screws by pinch-pointing, which involves a cold forging operation, and that type of method is described in U.S. Pat. No. 3,395,603.

The drilling end configuration can be formed by a machining operation as referred to in U.S. Pat. No. 3,125,923, but forging is generally preferred because it is a less expensive method of manufacturing the screws. Forged-end drilling screws however, do not usually match the machined screws in drilling efficiency. That results from any one or more of a variety of factors including inadequate or incomplete formation of the cutting edges at the drilling end tip, a negative rake behind those edges, inadequate control of the chisel point formation and inefficient removal of the butt or waste resulting from the drill tip forming operations.

It is an object of the present invention to provide a self-drilling screw having a forged point or drilling end and which has improved drilling efficiency. It is a further object of the invention to provide an improved method and means for forming forged point self-drilling screws.

The method of the invention is characterized in that the flow of material is controlled during forging of the drilling end configuration so that there is a greater likelihood of the tip end of the screw being completely and accurately formed. That control may be achieved in one arrangement by forming interruptions in surfaces of the dies which function during the forging operation to inhibit material flow away from the tip end. Preferably, the interruptions are such as to form transverse grooves in land surfaces of the screw drilling end portion adjacent the tip thereof. Alternatively, the desired flow control may be achieved by arranging the dies so that the drilling end portion when formed will have a pronounced elliptical shape, since such an arrangement promotes material flow axially towards the tip end during forging.

It is found that the method of the invention enables formation of a complete tapered end having sharp cutting edges and accurately formed chisel point. It is also found that the method consistently produces a positive rake behind the cutting edges and that is thought to result from the different force profile generated by the method, particularly at the time of separation of the butt from the screw body.

According to a further aspect of the invention there is provided a self-drilling screw having a forged drilling end configuration, wherein at least one interruption is formed in each of a plurality of side surfaces of said drilling end configuration.

According to another aspect of the invention there is provided a self-drilling screw including, a head at one end, a forged drilling portion at the opposite end, two longitudinally extending flutes formed in said drilling portion on respective opposite sides thereof, and each said flute comprises two portions which are arranged end to end and which extend generally longitudinally of said screw but at different angles relative to the longitudinal axis of the screw.

According to yet another aspect of the invention, there is provided a self-drilling screw including;
a head at one end, a forged drilling portion at the opposite end, two longitudinally extending flutes formed in said drilling portion on respective opposite sides thereof, a land surface extending between each side of each said flute and the adjacent side of the other said flute, and a fillet formed in the base of each said flute at least at the end thereof adjacent the tip of the drilling portion.

According to still another aspect of the invention, there is provided a die for cold-forging the drilling end configuration of a self-drilling screw, including a cavity which has a shape complementary to that of part of said drilling end configuration, and at least one interruption formed on a surface of said cavity which corresponds to a side surface of said drilling end configuration.

According to an additional aspect of the invention, there is provided a die for cold-forging the drilling end configuration of a self-drilling screw, including a cavity which has a shape complementary to that of part of said drilling end configuration, and a recess formed in a surface of said cavity at a location corresponding substantially to the junction between the drilling point tip and a cutting edge at that point of a screw having a drilling edge configuration formed by the die.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

Figure 2:
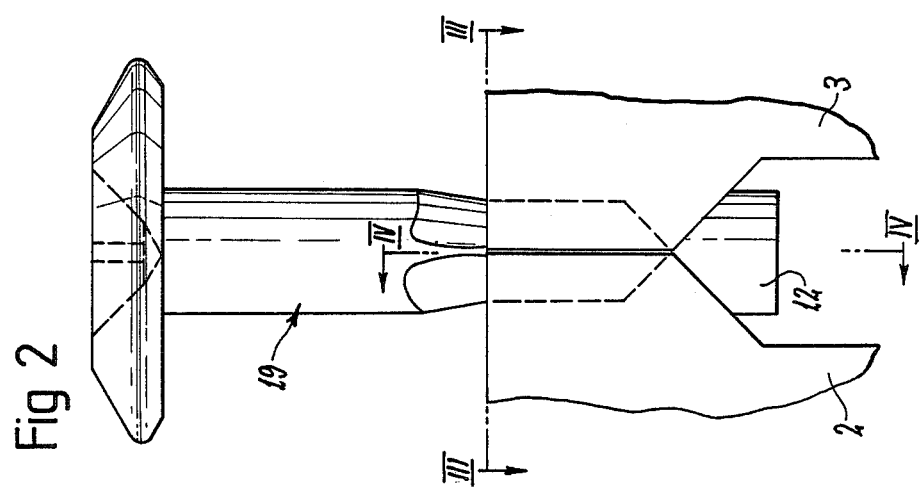
FIG. 2 is a view similar to FIG. 1 but showing the dies operated to forge the drilling end configuration on the screw blank.
Figure 1:
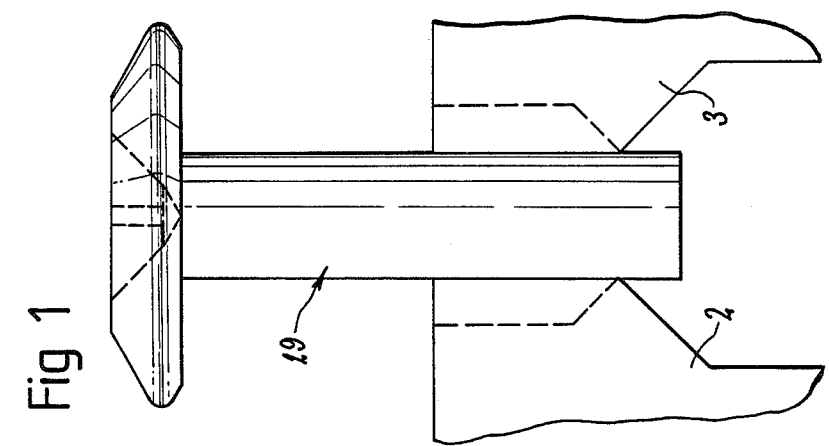
FIG. 1 is a diagrammatic view of a screw blank interposed between two pinch pointing dies.

FIGS. 1 and 2 show in diagrammatic form the manner of forging the drilling end configuration of self-drilling screw 1 (FIGS. 7 and 8) using pinch pointing dies 2 and 3. The thread 4 (FIG. 7) is usually formed after the forging operation and thread rolling dies (not shown) may be used for that purpose in a manner which is well known. As previously stated, the desired formation of the drilling tip 5 (FIG. 7) of the screw 1 can be achieved in various ways and FIGS. 3 and 4 are concerned with a die arrangement which achieves the foregoing by means of an inhibiting effect.

Figure 3:
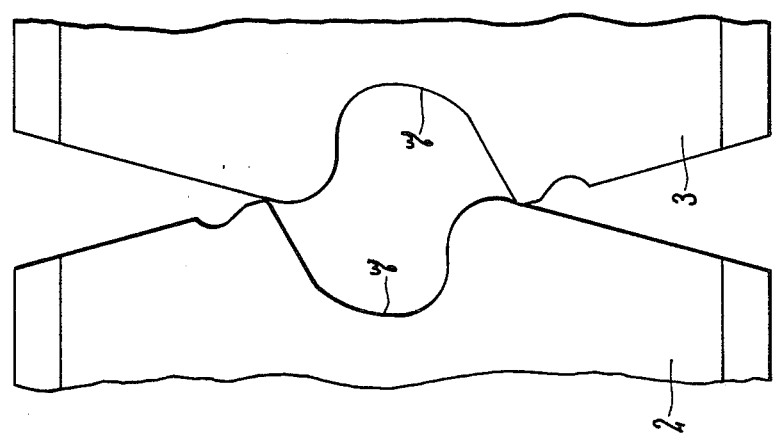
FIG. 3 is a view taken along line III—III of FIG. 2 but omitting the screw blank for convenience of illustration.
Figure 4:
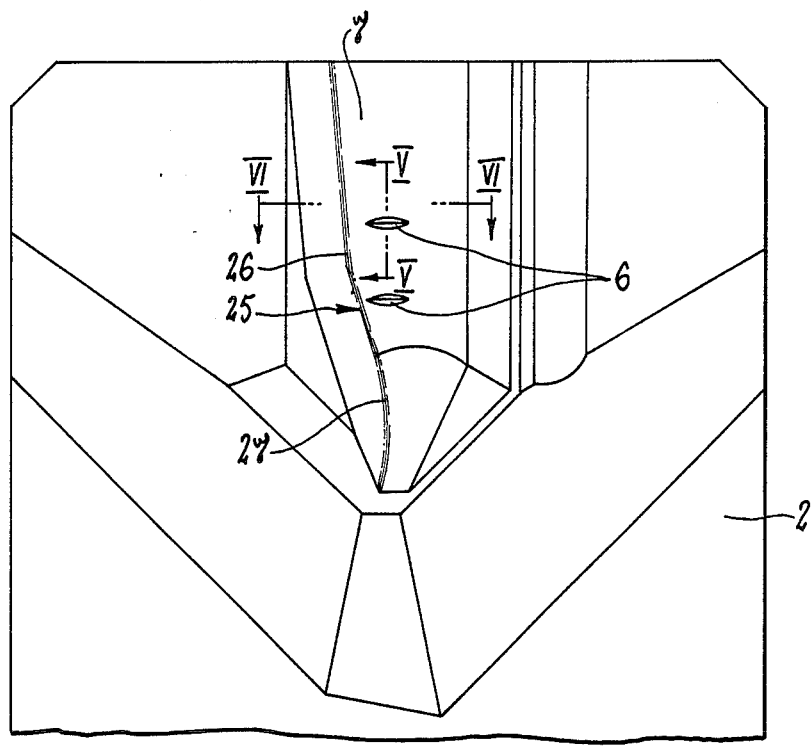
FIG. 4 is a view taken along line IV—IV of FIG. 2 and again omitting the screw blank for convenience of illustration.
Figure 6:
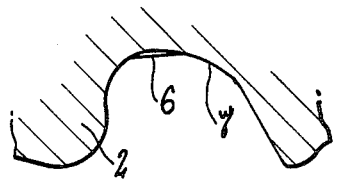
FIG. 6 is an enlarged cross sectional view taken along line VI—VI of FIG. 4.
Figure 5:
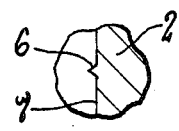
FIG. 5 is an enlarged cross sectional view taken along line V—V of FIG. 4.

In accordance with the particular embodiment of FIGS. 3 and 4, the foregoing inhibiting effect is achieved by provision of at least one rib 6 or ridges on a surface 7 of each die 2 and 3. Each rib 6 is located so that it will penetrate into a surface of the screw body during the forging operation and, as a consequence of that penetration, creates an obstruction against flow of displaced material away from the drilling tip 5. For that purpose, it is preferred that the rib 6 is relatively narrow and extends generally transverse to the longitudinal axis of the screw 1. It is also preferred that the rib 6 is of inverted V shape in cross section and that its longitudinal end portions slope so as to progressively reduce to zero height at the extremeties of the rib 6 (FIGS. 5 and 6).

Figure 7:
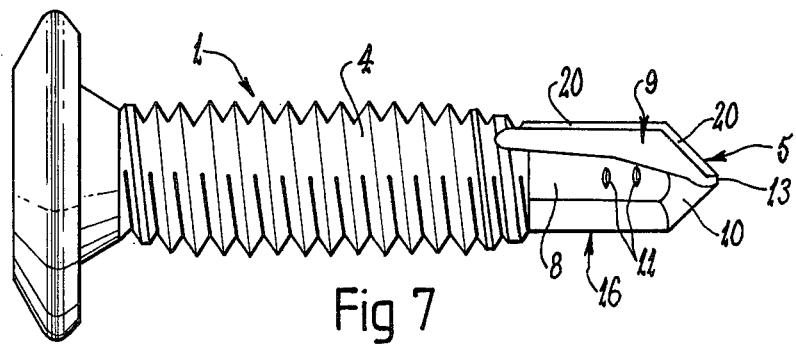
FIG. 7 is an elevation view of a screw having a drilling end portion formed by the dies of FIGS. 1 to 6.

A rib 6 as described may be positioned so that it penetrates into the land surface 8 of the screw body extending between the flutes 9 at a location adjacent a sloping tip end surface 10 (FIG. 7). In the preferred arrangement shown, there are two ribs 6 on each die 2 and 3 and those ribs 6 are spaced slightly apart in the axial direction of the screw 1. Thus, two ribs 6 will penetrate each of two opposite sides of the screw body during the pinch pointing operation so as to form transversely extending grooves 11 as shown in FIG. 7. Any other number and arrangement of ribs 6 may be adopted according to preference. Also, the ribs 6 may be located so as to penetrate into the surface of the flutes 9 as an alternative or addition to the foregoing arrangement.

Although ribs 6 as described are preferred, the aim of the method can be achieved by providing each die 2 and 3 with a projection or projections of different form. For example, each die 2 and 3 may have a series of relatively small projections which penetrate a surface of the screw body to provide the inhibiting effect previously described. A screw 1 produced in that way will have relatively rough area at each part of the surface engaged by a group of such die projections.

According to another alternative, which is also not shown, an interruption other than a projection may be provided on the dies 2 and 3 to achieve the aforementioned inhibiting effect. The or each die interruption may be a depression so that in the example of FIG. 7 the grooves 11 will be replaced by transversely extending ribs.

It is found that a method as described allows better control of the separation of the butt 12 (FIG. 2) from the screw body and that contributes to formation of a complete and efficient drilling end for the screw 1. In addition, closer control can be maintained over the degree of overlap of the ribs 6 at the tip end 5 and consequently the size of the chisel point 13 at the terminal end of the drilling tip is better controlled. Optimum drilling performance is achieved with a relatively narrow chisel point 13 and the foregoing method enables a selected size to be consistently achieved within acceptable tolerances.

Figure 8:
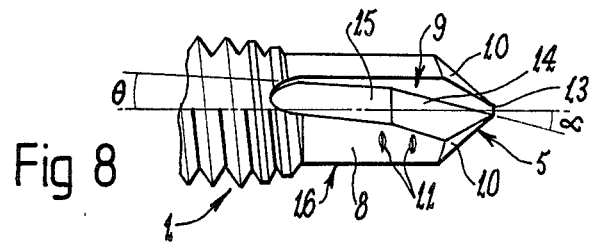
FIG. 8 is a view of the drilling end portion of the screw shown in FIG. 7 but with the screw rotated from the position shown in FIG. 7.

A self-drilling screw 1 made in accordance with the foregoing method may be further improved as shown in FIG. 8 by arranging each flute 9 so that it is composed of two portions 14 and 15 which extend at different angles $\alpha$ and $\theta$ relative to the longitudinal axis of the screw 1. The portion 14 of the flute 9 adjacent the tip end 5 of the screw 1 may slope at an angle $\alpha$ in the region of 18°, whereas the other or shallower portion 15 may slope at an angle $\theta$ closer to parallel with the shank axis and in one example that is roughly 5°. Such a double angle arrangement improves swarf removal during the drilling operation.

The method described in relation to FIGS. 1 to 8 relies on an inhibiting effect to achieve the desired complete formation of the screw tip end 5. The same result can be achieved by promoting material flow in the axial direction towards that tip end 5. That is, the dies 2 and 3 can be arranged to promote axial extrusion of material during the forging operation, and in particular extrusion in a direction towards the tip end 5.

Figure 9:
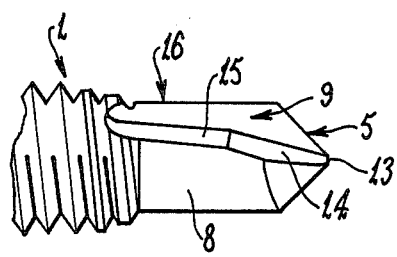
FIG. 9 is a view of the drilling end portion of another embodiment according to the invention.
Figure 10:
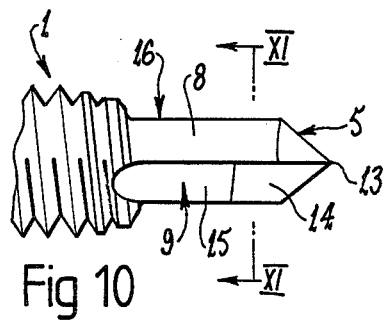
FIG. 10 is a view similar to FIG. 9 but showing the drilling end portion rotated through 90°.
Figure 11:
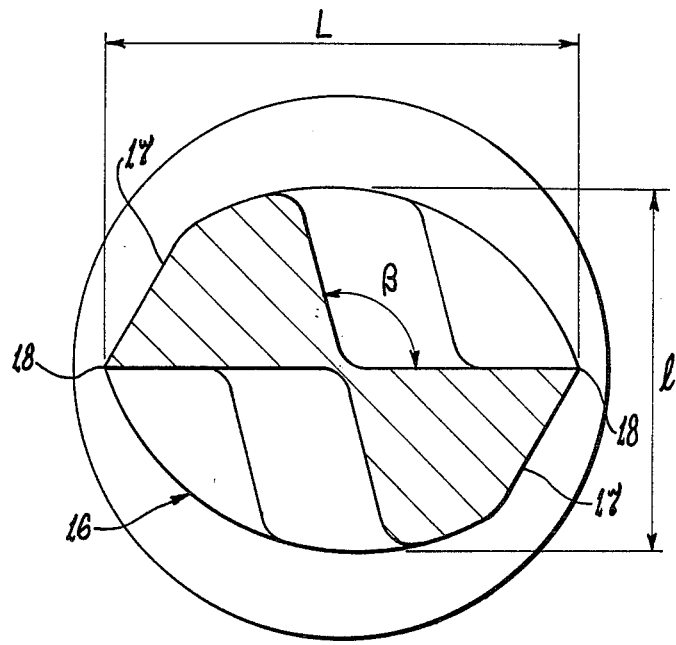
FIG. 11 is an enlarged cross sectional view taken along line XI—XI of FIG. 10.

It has been found that the foregoing can be achieved by arranging the dies 2 and 3 so that the drilling end portion 16 of the screw 1 has a pronounced elliptical shape as shown by FIGS. 9 to 11. In that regard, the cross sectional shape at that portion 16 is not necessarily a true ellipse, but is simply elliptical in form in that it has a minor axis and a major axis and the periphery may have flat sections 17 directly behind each flute leading edge 18 as shown in FIG. 11.

In the particular example shown, the length "1" of the minor axis is roughly 75% of the length "L" of the major axis. Other arrangements can be adopted however, and satisfactory results can be achieved with "1" in the range of 60 to 80% inclusive of "L".

When forming an elliptical or "flat" end portion 16 as shown, the dies 2 and 3 confine the material of the screw blank 19 so as to promote axial rather than lateral extrusion. Apart from enabling complete formation of the tip end 5 as referred to above, that form of extrusion has the advantage of requiring less force thereby leading to increased tool life.

If desired, an elliptical configuration as described above could be adopted in combination with inhibiting interruptions as described in connection with FIGS. 1 to 8.

FIGS. 12 to 15 show yet another aspect which can be adopted in combination with either or both of the arrangements previously described, or which can be used independently of those arrangements. In the following description that aspect is described as applied to a screw having an elliptical end formation as described in connection with FIGS. 9 to 11.

Figure 12:
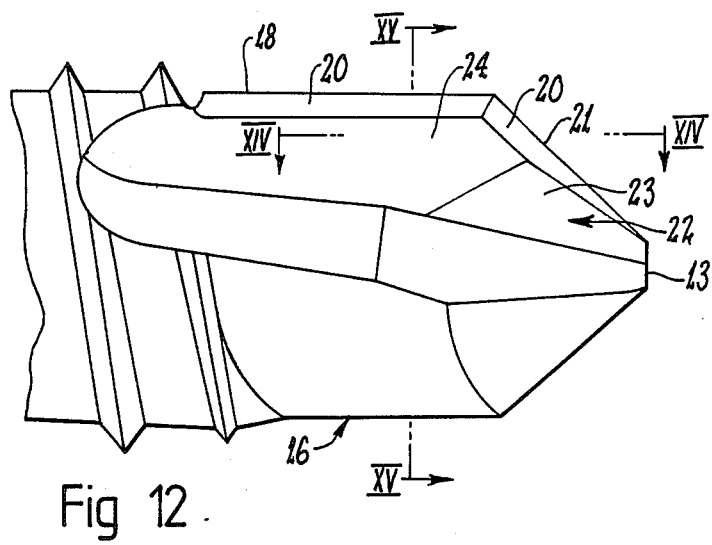
FIG. 12 is a view similar to FIG. 9 and showing yet another embodiment of the invention.

The end portion 16 of the screw 1 shown in FIG. 12 is as for the screw 1 shown in FIG. 9 except for two additions. The first is a relatively narrow lip 20 formed along both the flute leading edge 18 and the tip cutting edge 21, and the second is a fillet 22. The lip 20 is part of the prior art and is shown in FIG. 7, but not in FIG.

9 although it would normally be included in a screw 1 as shown by FIG. 9. It is usual to form such a lip 20 by providing a 15 degree rake directly behind each of the edges 18 and 21, although other angles could be adopted to suit particular requirements.

It is found that self-drilling screws of the kind under discussion tend to fail at the chisel point 13, particularly at the commencement of the drilling operation. The applied torque may need to be limited in order to meet that problem, but that may not be possible on all occasions and in any event tends to increase the time necessary to perform the drilling operation. A fillet 22 located at the base of each flute 9 at the tip end portion, serves to strengthen the chisel point 13 and thereby enable use of relatively high starting torques for the drilling operation.

Figure 13:
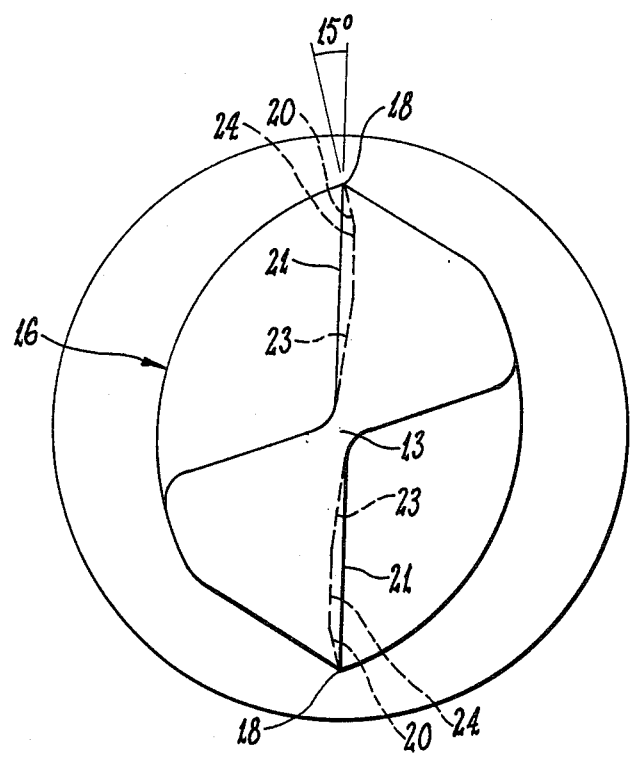
FIG. 13 is an end view of the drilling end portion shown in FIG. 12.
Figure 14:
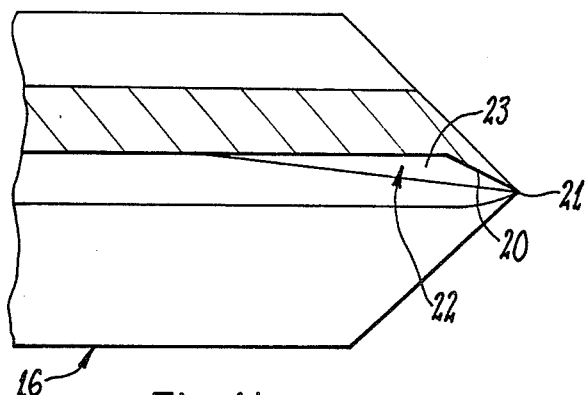
FIG. 14 is a cross sectional view taken along line XIV—XIV of FIG. 12.
Figure 15:
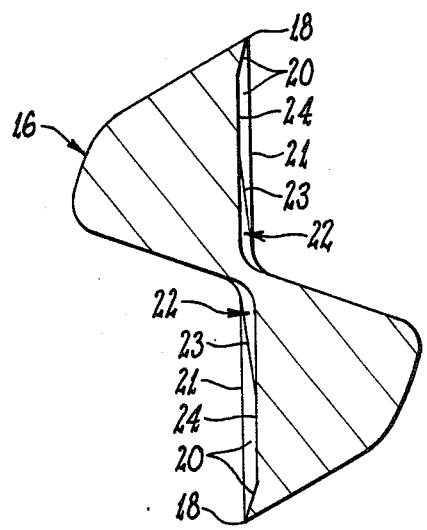
FIG. 15 is a cross sectional view taken along line XV—XV of FIG. 12.

The fillet 22 could take any of several different forms, but one particularly satisfactory form is shown in FIGS. 12 to 15. In that example arrangement each fillet 22 extends longitudinally from the chisel point 13 part way along the base of the respective flute 9. As shown, each fillet preferably has a substantially flat surface 23 which starts at the junction of the adjacent cutting edge 21 and the chisel point 13 and slopes transversely at an angle of say 5° (FIG. 13). The surface 23 is shown as located in a plane which is substantially parallel to the longitudinal axis of the screw 1, but other arrangements could be adopted. Because of the foregoing arrangement of the surface 23, it tends to blend into the flute surface 24 and thereby limits the extent of the fillet 22 as best seen in FIG. 12.

Figure 16:
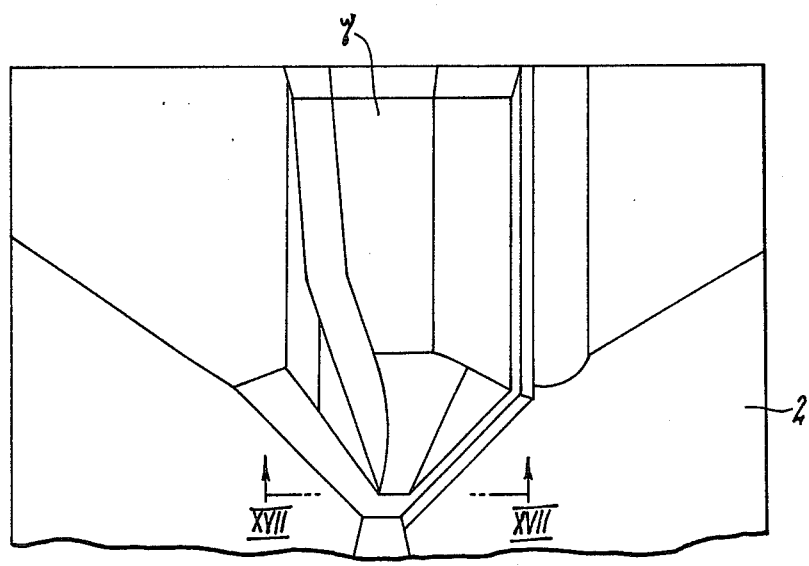
FIG. 16 is a view of part of a die suitable for forming the drilling end portion of FIGS. 12 to 15.
Figure 17:
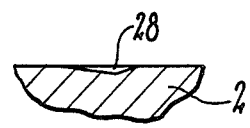
FIG. 17 is an enlarged cross sectional view taken along line XVII—XVII of FIG. 16.

FIGS. 16 and 17 show part of a die which is arranged to produce the fillet 22 as described. As shown, a recess 28 is formed in the die at an appropriate position for that purpose.

In any of the screw constructions described, it is preferred that the flutes 9 are relatively wide so as to promote clearance of swarf. That may be achieved as shown by having an included angle β (FIG. 11) of greater than 90° between the two sides of the flute 9. An included angle β in the range of 105° to 115° inclusive has been found to be satisfactory, although 110° is generally preferred.

The pinch pointing dies for use in forming any one of the screws described may be pre-stressed and formed of suitable material such as to increase their useful working life. Pre-stressing can be achieved by use of a pressure wedge to lock each die in place. It is further preferred that a radius is formed along the back edge of the heel line 25 of each die (FIG. 4) as that has been found to also increase die life. That radius need not be large and may be substantially consistent along the part 26 o the line 25 which corresponds to the main body part of the screw end portion 16, whereas in the tip part 27 of the die the radius may progressively reduce, possibly to zero, towards line 28 corresponding to the screw chisel point 13.

It will be apparent from the foregoing description that the method according to the invention is able to produce self-drilling screws of substantially improved quality. The screw according to any one of the forms described is superior to other screws of the same type in several respects. Furthermore, the dies for use with the method are superior to prior dies of the same kind in terms of useful life and the ability to consistently produce a drilling end of high efficiency.

Various alterations, modifications and/or additions may be introduced into the constructions and arrangements of parts previously described without departing from the spirit or ambit of the invention as defined by the appended claims.

We claim:

1. A self-drilling screw including: a head at one end, a forged drilling portion at the opposite end, two longitudinally extending flutes formed in said drilling portion on respective opposite sides thereof, a land surface extending between each side of said flute and the adjacent side of the other said flute, each said flute being comprised of a plurality of flute surfaces, and one of said flute surfaces being a fillet, said fillet being adjacent to the tip of the drilling portion, each said land portion having a leading edge and a trailing edge relative to the intended direction of rotation of said screw, each said land surface is arranged to be progressively located closer to the axis of the screw in a direction away from the respective said leading edge, and the minimum width of said drilling portion is 60 to 80% of the maximum width thereof, each said fillet extending across the base of the respective said flute and extending longitudinally from the chiselpoint of the screw towards the head and thereof for part only of the length of the respective said flute, each said fillet having a generally flat surface, said flat surface being angularly disposed relative to the longitudinal axis of the screw, and said fillet intersecting a substantial portion of said chiselpoint, and said fillet blending with said one of said flute surfaces.

2. A screw according to claim 1 wherein each said flat surface is arranged at substantially 5° relative to the axis of the screw.

3. A screw according to claim 1, wherein said drilling portion tip has two transversely extending cutting edges each of which merges with a leading edge of a respective said flute, a lip is formed along each said cutting edge and is defined by a surface extending angularly relative to the adjacent surface of the respective said flute, and said fillet flat surface extends angularly relative to the lip surface from adjacent said tip.

4. A screw according to claim 1, wherein said fillet extends longitudinally of said screw from the junction of said tip and the respective said cutting edge.

5. A screw according to claim 1, wherein each said flute is of substantially V-shape in transverse cross section and the included angle between the longitudinal sides thereof is greater than 90°.

6. A screw according to claim 5 wherein said included angle is substantially 110°.

7. A screw according to claim 5, wherein each said flute comprises two portions which are arranged end to end and which extend generally longitudinally of said screw but at different angles relative to the longitudinal axis of the screw, and the flute portion adjacent the screw head is at substantially 5° relative to the screw axis whereas the flute portion remote from said head is at substantially 18° relative to said screw axis

* * * * *